United States Patent
Gilton et al.

(10) Patent No.: US 12,058,453 B2
(45) Date of Patent: Aug. 6, 2024

(54) THERMAL IMAGING WITH SCANNING AT SUB-PIXEL LEVELS

(71) Applicant: Calumino Pty Ltd., Eveleigh (AU)

(72) Inventors: Terry L. Gilton, Boise, ID (US);
Gabrielle de Wit, Pymble (AU)

(73) Assignee: Calumino Pty Ltd., Eveleigh (AU)

( * ) Notice: Subject to any disclaimer, the term of this patent is extended or adjusted under 35 U.S.C. 154(b) by 56 days.

(21) Appl. No.: 17/974,149

(22) Filed: Oct. 26, 2022

(65) Prior Publication Data

US 2024/0147085 A1   May 2, 2024

(51) Int. Cl.
*H04N 25/21*   (2023.01)
*G01J 1/04*   (2006.01)
*H04N 23/23*   (2023.01)
*H04N 23/54*   (2023.01)
*H04N 23/55*   (2023.01)

(52) U.S. Cl.
CPC ............ *H04N 25/21* (2023.01); *G01J 1/0407* (2013.01); *H04N 23/23* (2023.01); *H04N 23/54* (2023.01); *H04N 23/55* (2023.01)

(58) Field of Classification Search
None
See application file for complete search history.

(56) References Cited

U.S. PATENT DOCUMENTS 9,344,696 B2   5/2016   Kempf et al.
9,851,256 B2 *  12/2017   Steffanson ............ G01J 5/0831

OTHER PUBLICATIONS

Extended European Search Report, EP23205694, mailed on Mar. 1, 2024.
Wikipedia, "Pixel Shift." Retrieved from the Internet <https://en.wikipedia.org/w/index.php?title=Pixel_shift&oldid=1081590218> on Apr. 8, 2022.
Xu, Bing, et al., "Super-resolution compressed sensing imaging algorithm based on sub-pixel shift." Cluster Computing, Baltzer Science Publishers, Jan. 25, 2018.

* cited by examiner

*Primary Examiner* — Christopher Braniff
(74) *Attorney, Agent, or Firm* — Greenberg Traurig

(57) ABSTRACT

A thermal imaging device having a scan mechanism operable to effectuate sequentially predetermined offsets, each configured between a thermal image of thermal radiations in a defined area on an imaging plane and an array of micro mirrors configured on a substrate. A respective image of a light pattern of a light beam reflected by a light reflection portion of each respective micro mirror in the array can be captured, when a rotation of the respective micro mirror, caused by radiation incident on a radiation absorption surface of the respective micro mirror, is stabilized at a respective offset. After computing a respective measurement of intensity measured by the respective micro mirror based on the respective image captured for the respective offset, a processor computes measurements of intensity of radiation in sub-areas of the thermal image, from measurements of intensity for the predetermined offsets, to generate a high resolution output.

20 Claims, 9 Drawing Sheets

THERMAL IMAGING WITH SCANNING AT SUB-PIXEL LEVELS

TECHNICAL FIELD

At least some embodiments disclosed herein relate to electromagnetic radiation detection in general, and more particularly but not limited to, the sensing of infrared (IR) radiation using micro mirrors.

BACKGROUND

U.S. Pat. No. 9,810,581, issued Nov. 7, 2017 and entitled "Micromechanical Device for Electromagnetic Radiation Sensing," discloses a micromechanical pixel configured for the sensing of thermal radiation intensity through the rotation of the micromechanical pixel in response to thermal radiation absorbed in the micromechanical pixel, the entire disclosure of which is incorporated herein by reference.

U.S. Pat. No. 9,851,256, issued Dec. 26, 2017 and entitled "Apparatus and Method for Electromagnetic Radiation Sensing," discloses a thermal radiation sensing apparatus having an optical system configured to measure the rotations of an array of micro mirrors, the entire disclosure of which is incorporated herein by reference.

U.S. Pat. No. 10,801,896, issued Oct. 13, 2020 and entitled "Sequential Beam Splitting in a Radiation Sensing Apparatus," discloses an optical system having multiple beam splitters configured for the measurement of the rotations of an array of micro mirrors, the entire disclosure of which is incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
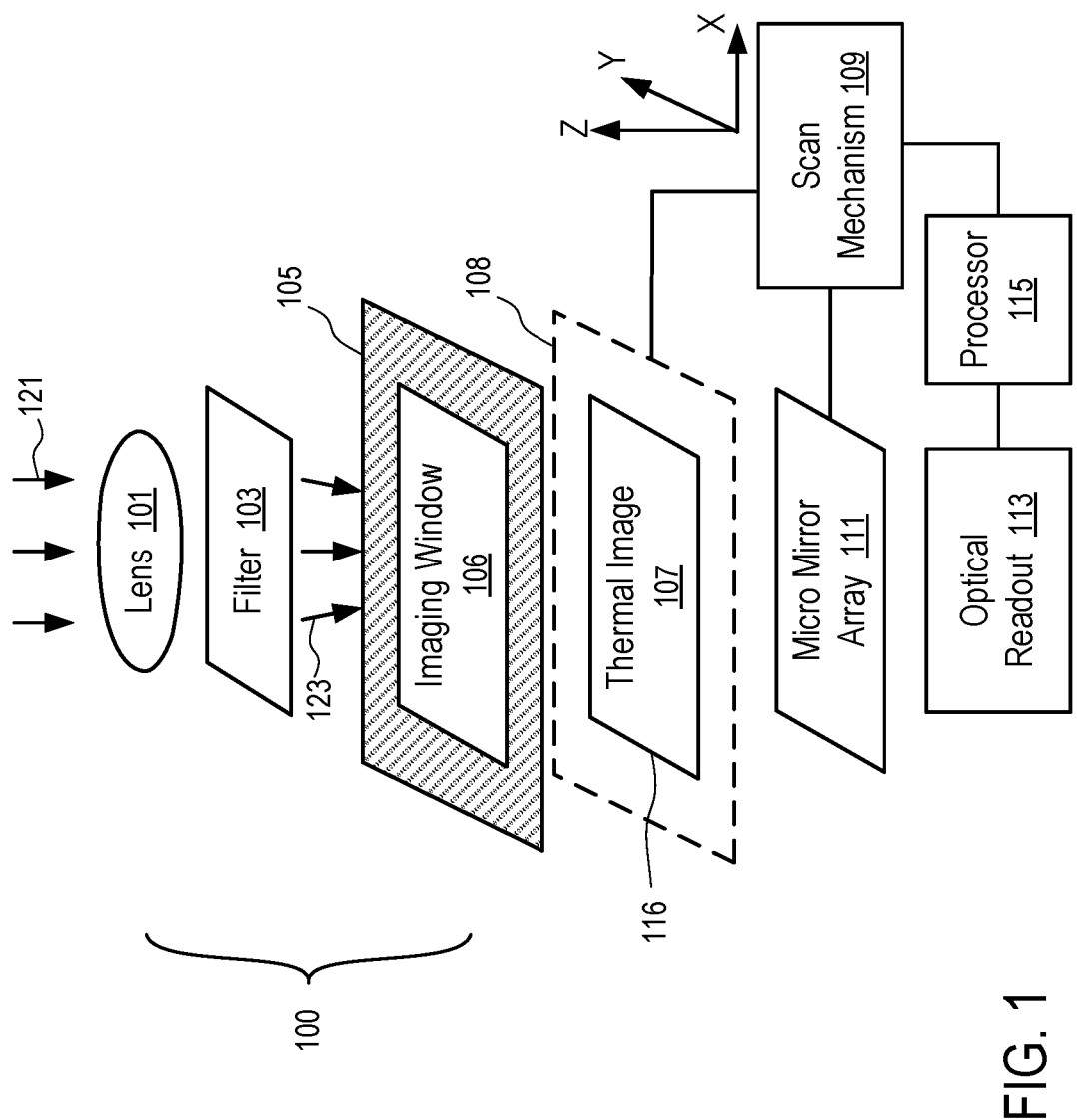
FIG. 1 shows a thermal imaging device having a scan mechanism to measure a thermal radiation distribution at sub-pixel offsets according to one embodiment.

At least some embodiments disclosed herein provide techniques to measure a thermal radiation distribution, representative of a thermal image, at a pixel resolution higher than the pixel resolution of a micro mirror array.

A micro mirror configured as an imaging pixel can convert the intensity of thermal radiation incident on its radiation absorption surface into an angle of rotation of the micro mirror. An optical system can be configured to use an optical image sensor to measure the rotation through imaging the position change of a light spot reflected off the micro mirror. The intensity of thermal radiation on the radiation absorption surface can be calculated from the rotation measured using the optical system.

For example, an optical image sensor configured based on a complementary metal-oxide-semiconductor (CMOS) technique or a charge-coupled device (CCD) technique can be used in the optical system.

An array of micro mirrors can be used to measure a distribution of the intensity of thermal radiation, representative of a thermal image, incident on the plane of the radiation absorption surfaces of the micro mirrors. The angle of rotation of each micro mirror in the array can be used to compute a value of a pixel in a thermal image. Thus, the output of the measurements made via the micro mirror array can have a resolution equal to the resolution of the micro mirror array; and the count of pixel values in the output is equal to the count of micro mirrors in the array.

A micro mirror manufactured as an imaging pixel in a chip can be large (e.g., on the order of 100 micrometers). Thus, the pixel resolution of the micro mirror array in the chip can be low for some applications of thermal imaging (e.g., lower than the video graphics array (VGA) resolution of 640 by 480).

A typical thermal imaging application is configured to generate outputs at a low frame rate (e.g., 9 frames per second), when compared to the imaging speed of thermal imaging devices having micro mirror arrays. Optical image sensors usable to measure rotations of micro mirrors at a much higher frame rate are readily available. Therefore, within the duration of generating one frame of thermal imaging output, a thermal imaging device having a micro mirror array can be used to measure multiple frames of a thermal image with sub-pixel levels of offsets to generate a frame of combined thermal imaging output that has a resolution higher than the resolution of the micro mirror array.

For example, the relative position between a distribution of thermal radiation, representative of a thermal image to be measured, and the micro mirror array can be changed or shifted to have a series of sub-pixel offsets. Each offset can be a fraction of the dimensions (e.g., length and width) of a micro mirror in the array. Comparing the measurement results made using the micro mirror array, intensities of thermal radiation in sub-areas, in the thermal image, having dimensions smaller than the dimensions of a micro mirror can be determined to generate a high resolution output.

For example, a scan mechanism can be used to move the thermal lens, or the micro mirror array, or both, to change the relative position between the thermal image and the micro mirror array according to predetermined, desirable offsets. For example, a sensor shifter, a lens stabilizer, a camera body stabilizer, or a combination of these devices typically used for image stabilization in cameras, or similar devices (e.g., actuators, piezoelectric elements) can be adapted and simplified to function as the scan mechanism to change the offsets between the thermal image and the micro mirror array. For example, devices for image stabilization are designed to detect and reduce/minimize the random shaking or vibration that can cause the movement of an image on a film or relative to an image sensor. To use as a scan mechanism, such devices can be simplified to implement predetermined offsets without detection of random movements or vibrations. Optionally, such devices can also be used to perform image stabilization as well, in addition to effectuate predetermined offsets, for the thermal imaging device.

For example, 4 frames of thermal images measured at ½ micro mirror offset in each direction can be used to construct a frame output at 2 times the resolution of the micro image array in each dimension. For example, 9 frames of thermal images measured at ⅓ pixel offset in each direction can be used to construct a frame output at 3 times the resolution of the micro image array in each dimension.

FIG. 1 shows a thermal imaging device having a scan mechanism to measure a thermal radiation distribution at sub-pixel offsets according to one embodiment.

In FIG. 1, the thermal imaging device has a lens system 100, a micro mirror array 111, a sub-system of optical readout 113, a scan mechanism 109, and a processor 115 (or controller, or signal processing circuit, or both) that controls and synchronizes the operations of the scan mechanism 109 and the sub-system of optical readout 113.

The lens system 100 is configured to direct and restrict radiations from a scene to form, as a thermal image 107 to be measured, a distribution of thermal radiation in an area of an imaging plane 108.

For example, the lens system 100 can include an infrared lens 101 to change the directions of the incoming thermal radiations 121 as radiations 123 going through a filter 103 and an imaging window 106 towards the imaging plane 108 configured at or near a focal plane of the lens 101.

The filter 103 is configured to block radiations of wavelengths outside of a range for infrared radiations to be sensed but allow infrared/thermal radiations 123 of selected wavelengths to go through towards the imaging plane 108. Optionally, multiple filters can be used to block radiations in different ranges of wavelengths; and one or more filters 103 can be placed before the lens 101, or after the lens 101, or both, on the radiation paths from a scene through the lens 101 to the imaging plane 108.

A window element 105 can be used to block thermal radiations outside of the imaging window 106 and thus limits thermal radiations to be measured to a defined area of the thermal image 107. The boundaries of the imaging window 106 define the boundaries 116 of the thermal image 107. The thermal radiation on the imaging plane 108 and outside of the boundary 116 is negligible, or uniform, or both. The scan mechanism 109 can be used to adjust the offset of the boundaries 116 of the thermal image 107 relative to micro mirrors in the array 111, as illustrated in FIG. 2 to FIG. 5.

The imaging plane 108 of the thermal image 107 can be configured on a plane of radiation absorption surfaces of micro mirrors in the array 111.

After the relative position between the thermal image 107 and the micro mirror array 111 is fixed for a period of time by the scan mechanism 109, each micro mirror is exposed to a particular area of thermal radiation within the thermal image 107 and thus measures the average intensity within the particular area. When the micro mirror is charged up in energy from the thermal radiation in the area, the temperature of the micro mirror reaches an equilibrium, which causes the micro mirror to have a stable angle of rotation that can be measured using the sub-system of optical readout 113 to compute the average intensity of thermal radiation in the area.

Figure 6:
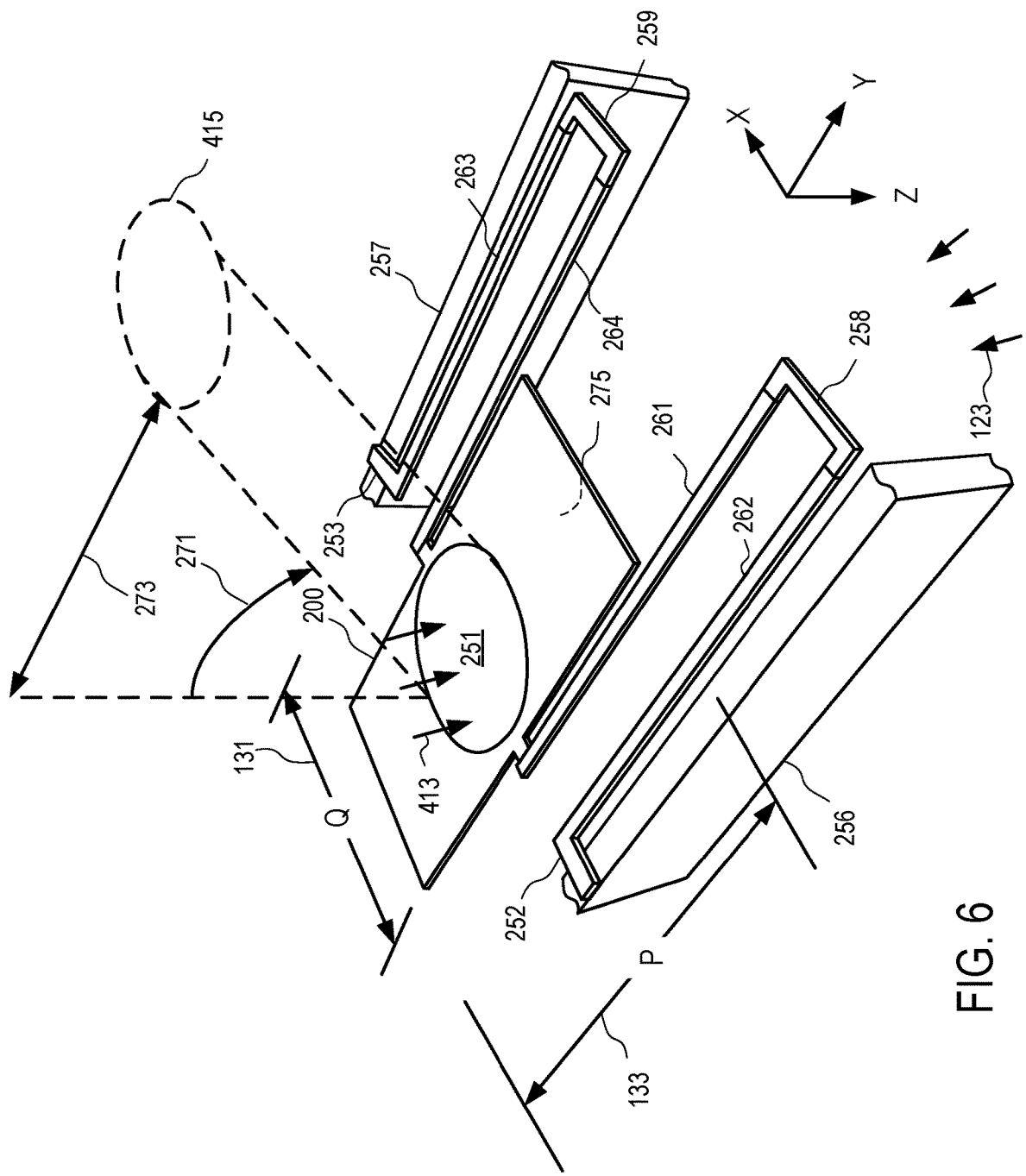
FIG. 6 shows a micro mirror operable in a thermal image device according to one embodiment.
Figure 7:
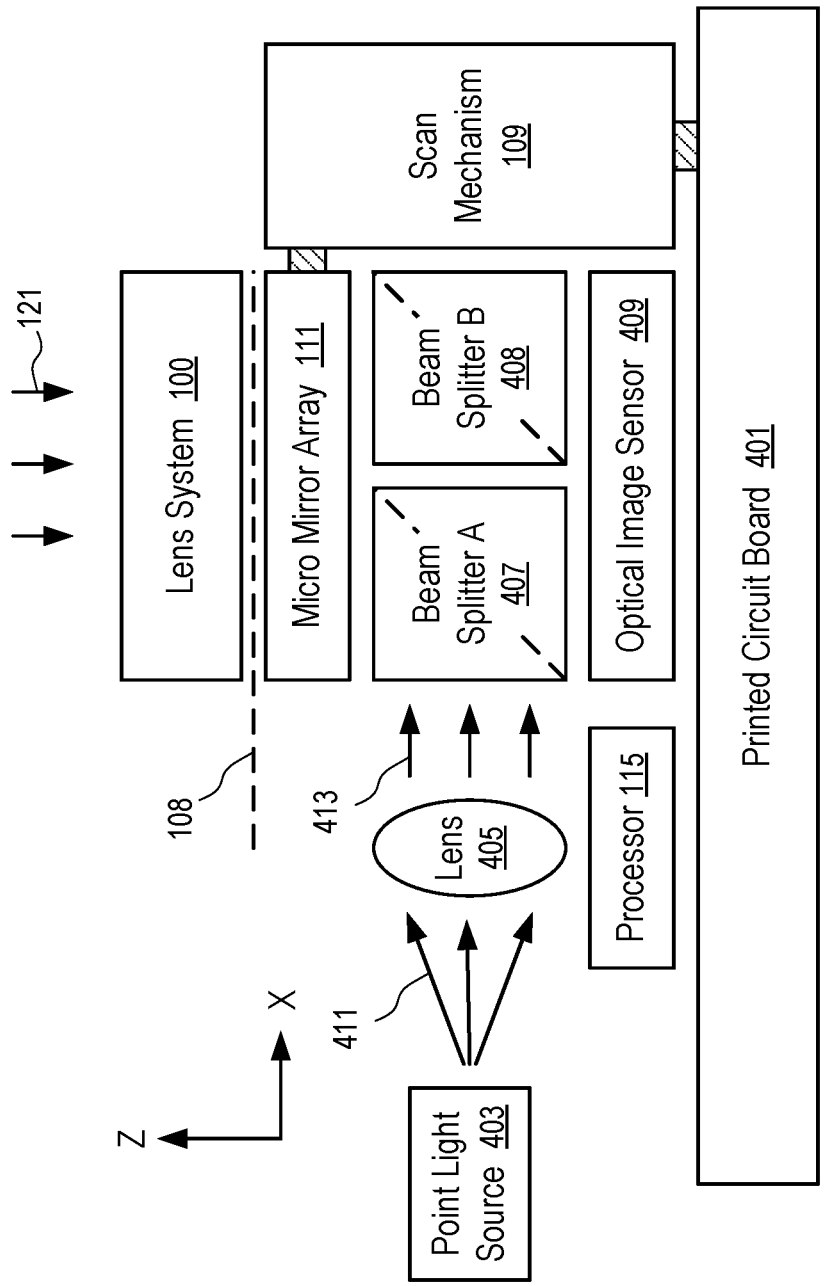
FIG. 7 shows a thermal imaging device having a scan mechanism and a sub-system of optical readout to measure rotations of micro mirrors according to one embodiment.

For example, a micro mirror of FIG. 6 can be used in the micro mirror array 111 to convert the intensity of thermal radiation incident on the radiation absorption surface of the micro mirror as an angle of rotation of the micro mirror; and a sub-system of optical readout 113 of FIG. 7 can be used to determine/measure the rotation that is representative of the thermal radiation intensity measured using the micro mirror. Micro mirrors and sub-systems of optical readout of alternative designs can also be used.

To generate a measurement of the thermal image 107 at a resolution higher than the micro mirror array 111, the processor 115 can control the scan mechanism 109 to change the relative position between the thermal image 107 and the micro mirror array 111 to have sub-pixel offsets, as further illustrated in FIG. 2 to FIG. 5. Each offset can have a dimension that is a fraction of the dimension of the radiation absorption surface of a micro mirror in the array 111. The offset can have an amount in the width direction of the micro mirror array 111 (e.g., along X-axis) and another amount in the length direction of the micro mirror array 111 (e.g., along Y-axis).

For example, the processor 115 can instruct the scan mechanism 109 to adjust the relative position between the thermal image 107 and the micro mirror array 111 according to an offset; and when the micro mirrors in the array 111 are charged up by the thermal image 107 at the current position (e.g., after having been in the current position for at least a predetermined period of time), the processor 115 can instruct the optical readout 113 to measure the rotations of the micro mirrors in the array 111. Subsequently, the processor 115 can instruct the scan mechanism 109 to adjust the relative position between the thermal image 107 and the micro mirror array 111 according to another offset; and when the micro mirrors in the array 111 are charged up by the thermal image 107 at the current position (e.g., after having been in the current position for at least a predetermined period of time), the processor 115 can instruct the optical readout 113 to again measure the rotations of the micro mirrors in the array 111.

From the measurements of the thermal image 107 obtained at varying offsets, measurements of radiation intensity in sub-areas having sizes smaller than the sizes of the radiation absorption surface of a micro mirror in the array 111 can be calculated. The calculated intensity for the sub-areas can be used to construct an output at a resolution that is higher than the resolution of the micro mirror array 111.

The scan mechanism 109 is configured to move the thermal image 107 and the micro mirror array 111 relative to each other, along the X-axis and the Y-axis, with predetermined increments along the imaging plane 108.

For example, the devices used for image stabilization in conventional imaging systems and cameras (e.g., sensor shifters, lens stabilizers, camera body stabilizers) can be used as actuators of the scan mechanism 109.

For example, the scan mechanism 109 can include a piezoelectric element configured to move the micro mirror array 111 relative to the thermal image 107 by a predetermined among along each of the X-axis and the Y-axis in response to a predetermined electric signal. Alternative actuators can also be used.

In one implementation, the scan mechanism 109 is controlled by the processor 115 to move the micro mirror array 111 within the thermal imaging device as a whole, without moving the thermal image 107 in the space. The processor 115 also controls the sub-system of optical readout 113 to measure the rotations of the micro mirrors array 111 at time instances when the micro mirrors are fully charged up thermally at new positions where the rotations of the micro mirrors are stabilized in balance with their absorbed thermal radiations at their new positions. Since the scan mechanism 109 moves the micro mirror array 111 within the thermal imaging device moving the sub-system of optical readout 113 and the lens system 100, the light spots as measured by the sub-system of optical readout 113 move a distance corresponding to the offset effectuated by the scan mechanism 109. The processor 115 can communicate the offset to the sub-system of optical readout 113 to compensate in the measurements of travel distances of the light spots from the micro mirrors in the array 111. Alternatively, the processor 115 is configured to obtain the optical image of the light spots captured in the sub-system of optical readout 113 and perform the compensation in calculation of the rotations and radiation intensities experienced by the micro mirrors in the array 111.

Alternatively, the scan mechanism 109 can be configured to move both the micro mirror array 111 and the sub-system of optical readout 113 together in unison within the thermal imaging device.

Alternatively, the scan mechanism 109 is configured to move the lens system 100 (and thus the thermal image 107) within the thermal imaging device without moving the micro mirror array 111.

FIG. 2, FIG. 3, FIG. 4, and FIG. 5 illustrate examples of scanning positions of a micro mirror array relative to a thermal image to generate a high resolution output according to one embodiment. For example, the scanning illustrated in FIG. 2 to FIG. 5 can be implemented in the thermal imaging device of FIG. 1.

In FIG. 2 to FIG. 5, the micro mirror array 111 (e.g., of a thermal imaging device of FIG. 1) has rows of micro mirrors (e.g., 201, 202, 203, . . . ) along the X-axis direction (e.g., width direction) and columns of micro mirrors (e.g., 201, 211, 221, . . . ) along the Y-axis direction (e.g., length direction).

Each micro mirror (e.g., 201) has a radiation absorption surface extending over a width 131 (Q) and a length 133 (P). Thermal radiation absorbed in the surface by a typical micro mirror (e.g., 212) causes a rotation of the micro mirror (e.g., 212). The intensity of the thermal radiation determines the magnitude of the rotation. Thus, the measurement generated by the sub-system of optical readout 113 based on imaging the light spot reflected on the micro mirror (e.g., 212) is representative of an average of radiation intensity on the entire radiation absorption surface of the micro mirror (e.g., 212).

To obtain a high resolution measurement of the thermal image 107, the scan mechanism 109 of the thermal imaging device of FIG. 1 is configured to be operable to change the relative position between the thermal image 107 and the micro mirror array 111 to have sub-pixel offsets. Each offset can be a fraction of the width 131 (Q) in the width direction (e.g., X-axis) and a fraction of the length 133 (P) in the length direction (Y-axis). By measuring the average intensity of areas corresponding to the radiation absorption surfaces of the micro mirrors (e.g., 201, 212, . . . ), the intensity of the sub-areas (e.g., 301, 303, 305, 311) can be calculated from the measurements at sub-pixel offsets.

Figure 2:
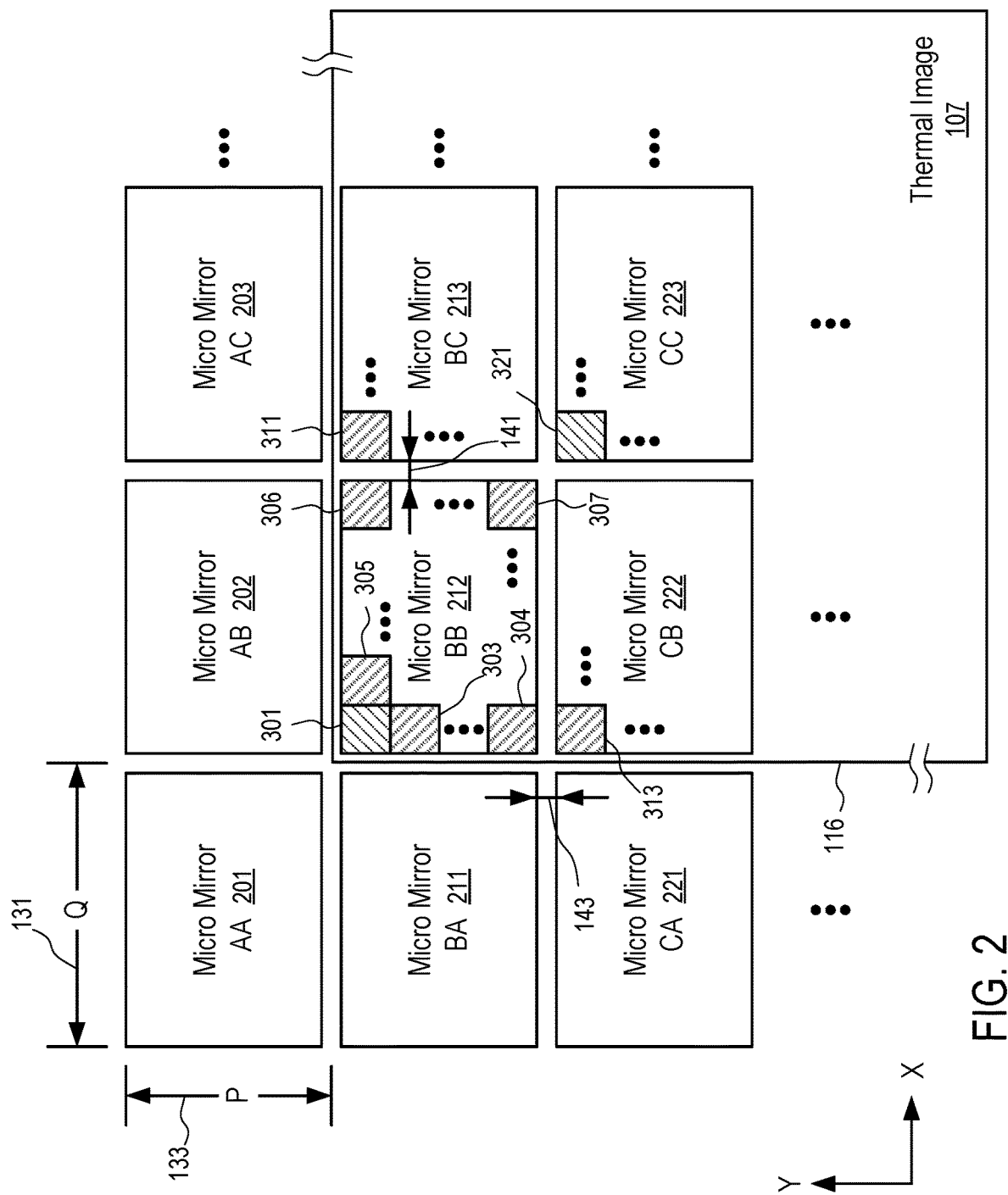
FIG. 2, FIG. 3, FIG. 4, and FIG. 5 illustrate examples of scanning positions of a micro mirror array relative to a thermal image to generate a high resolution output according to one embodiment.

FIG. 2 illustrates a position where the offset is by a full width 131 and a full length 133 of a micro mirror. In such a position, the top row and the left most column of micro mirrors (e.g., 201, 202, 203, . . . ; 201, 211, 221, . . . ) are outside of the thermal image 107. The position of FIG. 2 is for illustrate; and it is not necessary to measure the thermal image 107 with such an offset as in FIG. 2. Optionally, the position of FIG. 2 can be used to measure the environmental thermal radiation within the thermal imaging device.

At various offset positions (e.g., as in FIG. 3, FIG. 4, FIG. 5), different combinations of sub-areas (e.g., 301, 303, 305) of the thermal images 107 are measured by a micro mirror (e.g., 201). The different measurements can be combined to compute the intensities of thermal radiation in the sub-areas (e.g., 301, 303, 305), as discussed below.

For example, when the thermal image 107 and the micro mirror array 111 have no offset, the average intensity of thermal radiation of the area measured by the micro mirror 212 in FIG. 2 is measured by the micro mirror 201. The measured area includes sub-areas 301, 303, . . . , 304, 305, . . . , 306, . . . , and 307.

Figure 3:
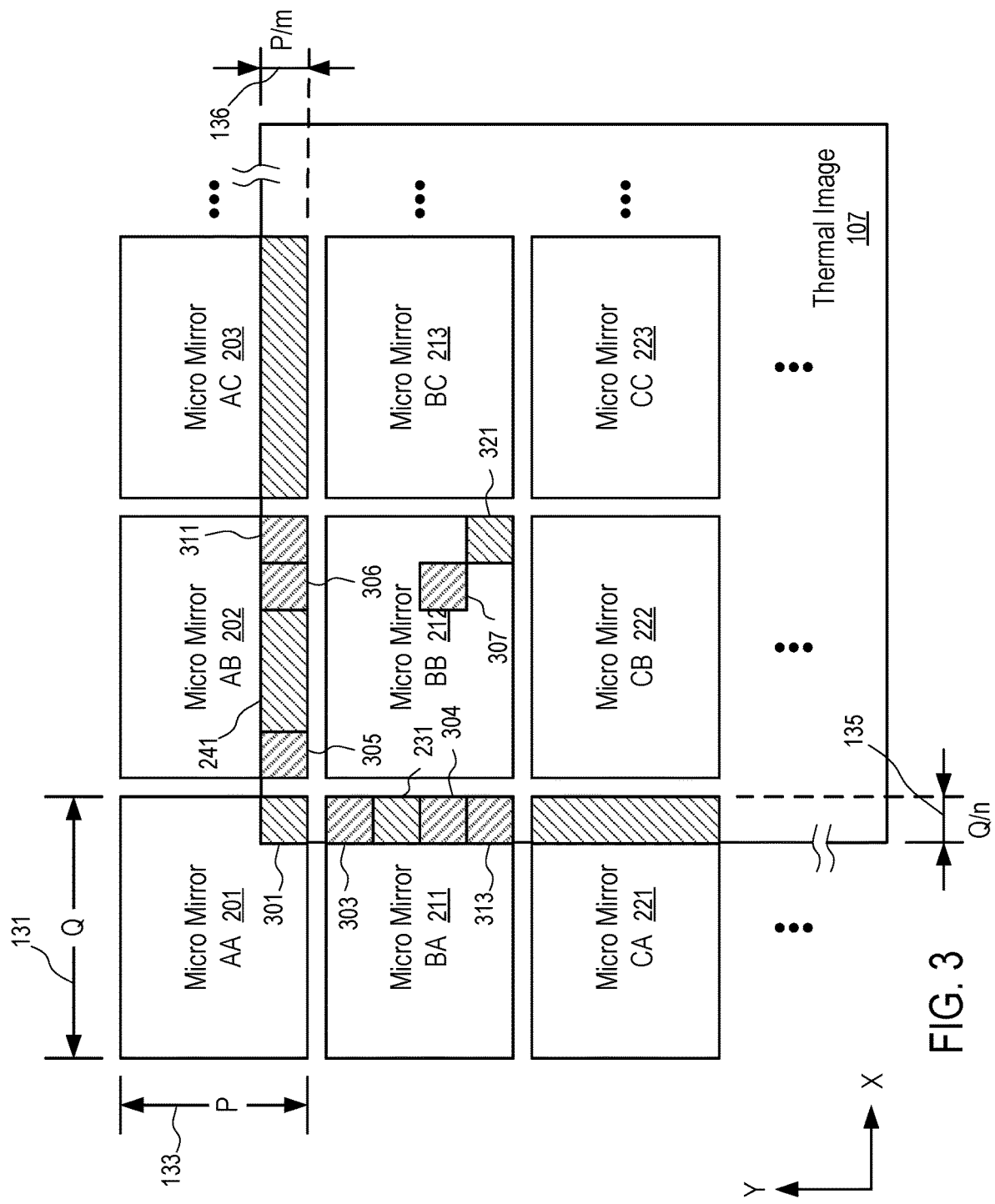

When the thermal image 107 and the micro mirror array 111 have an offset as illustrated in FIG. 3, a sub-area 301 of the thermal image 107 having a width 135 of Q/n and a length 136 of P/m is measured by the micro mirror 201. The thermal radiation on the micro mirror 201 and outside of the sub-area 301 is known (e.g., negligible, or as an environmental thermal radiation within the thermal imaging device, e.g., as measured by the micro mirror 201 at the position of FIG. 2). Thus, the average thermal intensity as measured by the micro mirror 201 in FIG. 3 can be used to calculate the thermal radiation intensity of the sub-area 301. For example, the average intensity within the sub-area 301 can be calculated and obtained as a measurement of the thermal radiation intensity of the sub-area 301, by deducting, from the average intensity as measured by the micro mirror 201 at the position of FIG. 3, the contribution of the thermal radiation on the radiation absorption surface of the micro mirror 201 but outside of the sub-area 301 (e.g., negligible or as measured by the micro mirror 201 at the position of FIG. 2).

Figure 4:
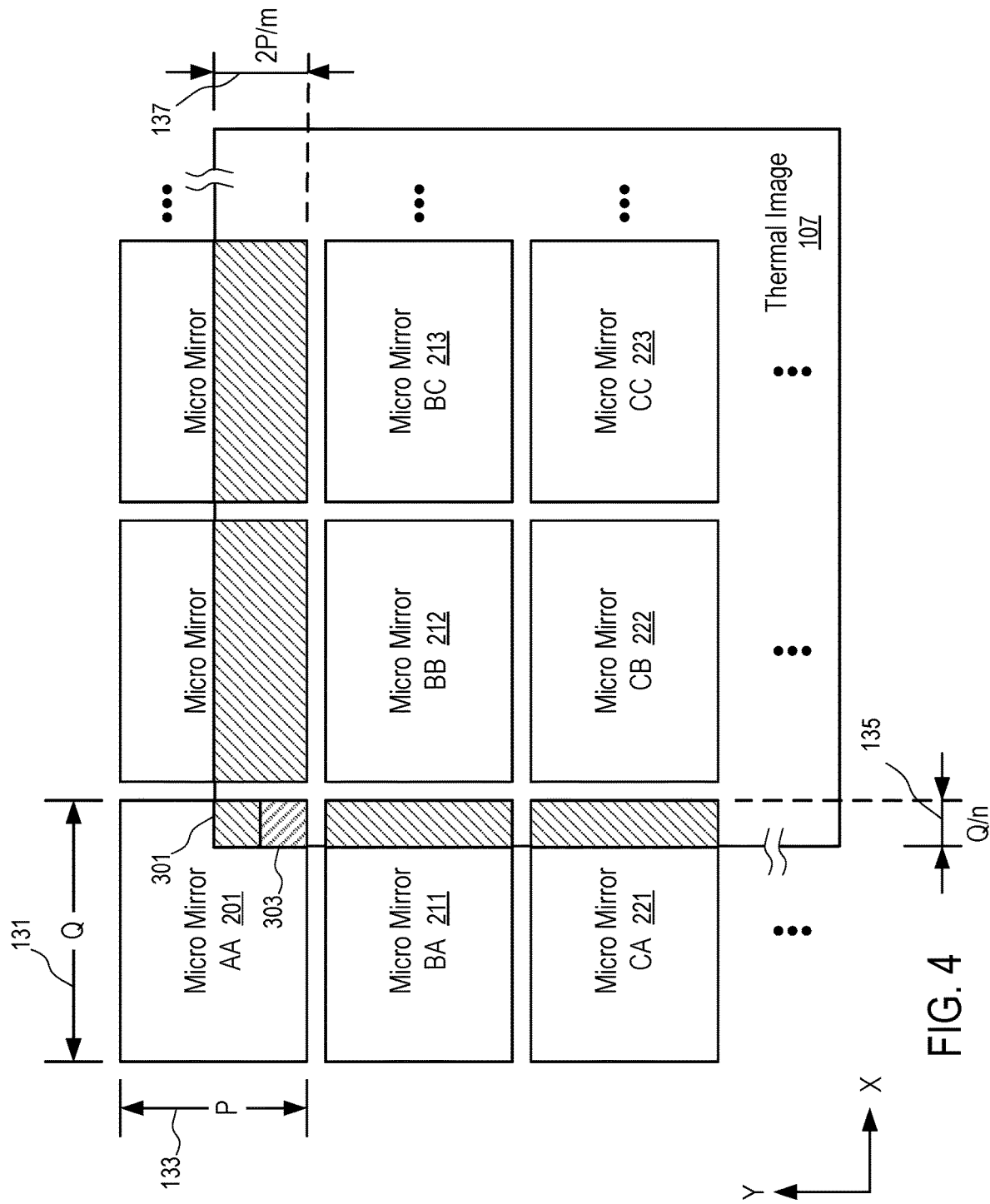
Figure 5:
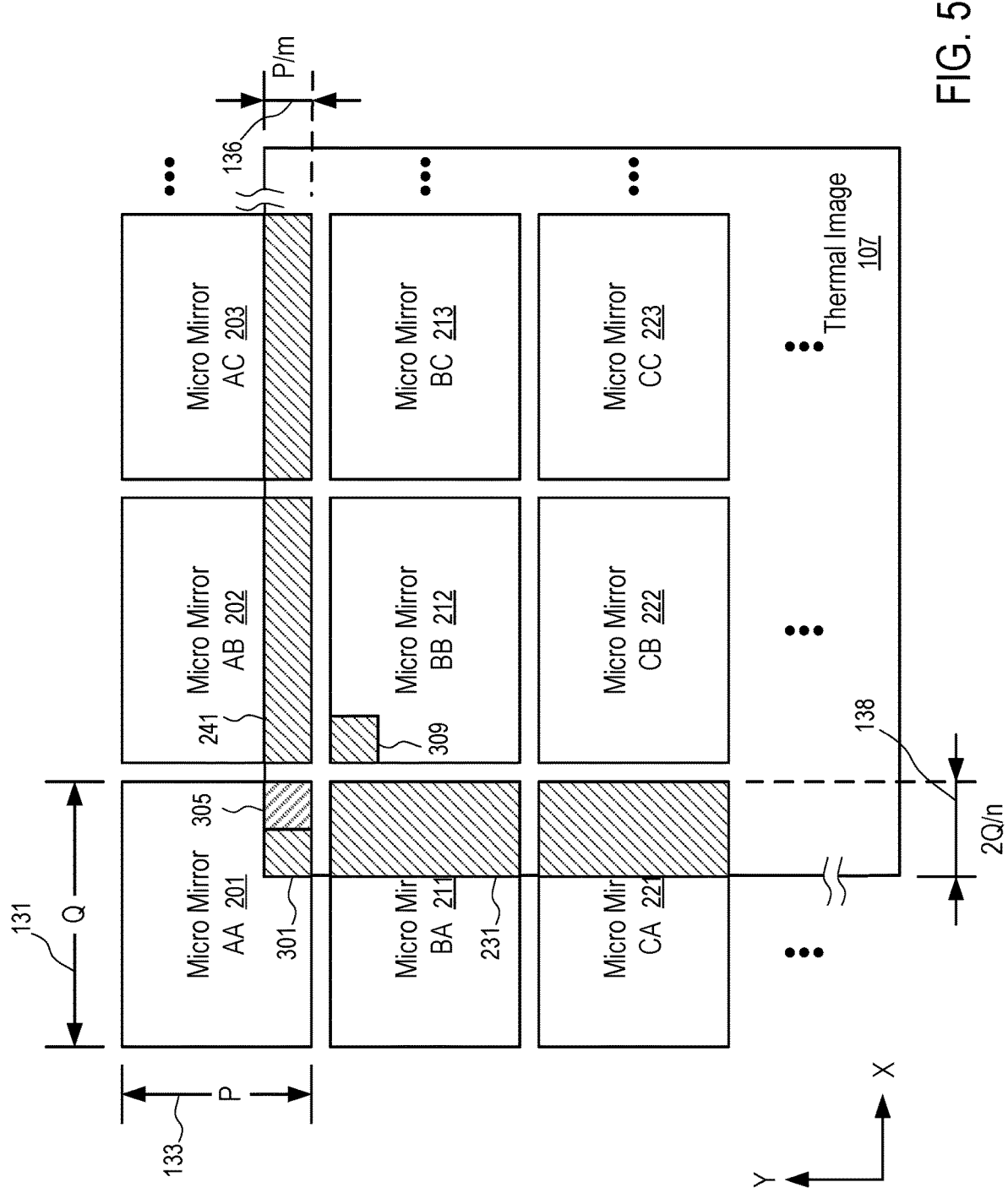

With the measurement of the thermal radiation intensity of the sub-area 301 of the thermal image 107, another measurement of the micro mirror 212 obtained at a different offset can be used to the thermal radiation intensity of another sub-area (e.g., 303 or 305) of the thermal image 107 that is adjacent to the sub-area 301, as illustrated in FIG. 4 and FIG. 5.

For example, when the thermal image 107 and the micro mirror array 111 have an offset of a width 135 of Q/n and a length 137 of 2P/m as illustrated in FIG. 4, the micro mirror 201 is exposed to the thermal radiation of the sub-areas 301 and 303 of the thermal image 107. Since the thermal radiation on the micro mirror 201 and outside of the sub-areas 301 and 303 is known (e.g., negligible or as an environmental thermal radiation within the thermal imaging device), a measurement of the thermal radiation intensity of the sub-area 303 can be calculated from the average thermal intensity as measured by the micro mirror 201 in FIG. 4 and the thermal radiation intensity of the sub-area 301.

Similarly, when the thermal image 107 and the micro mirror array 111 have an offset of a width 138 of 2Q/n and a length 136 of P/m as illustrated in FIG. 5, the micro mirror 201 is exposed to the thermal radiation of the sub-areas 301 and 305 of the thermal image 107. Since the thermal radiation on the micro mirror 201 and outside of the sub-areas 301 and 305 is known (e.g., negligible, or known as an environmental thermal radiation within the thermal imaging device, e.g., as measured by the micro mirror 201 at the position of FIG. 2), a measurement of the thermal radiation intensity of the sub-area 305 can be calculated from the average thermal intensity as measured by the micro mirror 201 in FIG. 5 and the thermal radiation intensity of the sub-areas 301.

With the measurements of the thermal radiation intensity of the sub-areas 301, 303, and 305 of the thermal image 107, another measurement of the micro mirror 212 obtained at an offset that causes the micro mirror 201 to measure a further sub-area (e.g., 309) in combination with sub-areas 301, 303, and 305 can be used to calculate the thermal radiation intensity of the further sub-area (e.g., 305).

In such a way as illustrated above, the thermal imaging device of FIG. 1 can scan the sub-areas (e.g., 301, 303, ..., 304, 305, ..., 306, ..., 307) of an area of the thermal image 107 that is measured using the micro mirror 201 in the position without an offset (and measured by the micro mirror 212 with an offset as illustrated in FIG. 2). By the scan mechanism 109 incrementally and systematically moving sub-areas (e.g., 301, 303, ..., 304, 305, ..., 306, ..., 307) of the thermal image 107 into (and out of) the micro mirror 201, the thermal imaging device of FIG. 1 can generate an n by m resolution output for the area in the top left most corner of the thermal image 107, instead of a single-pixel output.

With the measurements of the thermal radiation intensity of the sub-areas 301, 303, ..., 304, 305, ..., 306, ..., 307 in the top left most portion of the thermal image 107 (e.g., calculated based on the measurements of the micro mirror 201 with sub-pixel offsets from the thermal image 107), the thermal radiation intensity of the sub-areas (e.g., 311) in the adjacent areas of the thermal image 107 can be computed from the measurements of adjacent micro mirrors (e.g., 202 and 211) in the same row or column as the micro mirror 201.

For example, the micro mirror 202 measures the average intensity of the sub-areas 305, 241, 306, and 311 (and a portion environmental radiation outside of the thermal image 107) in FIG. 3. After the thermal radiation intensities of sub-areas 305, 241, 306 have been calculated based on the measurements of the micro mirror 201 at varying offsets, the intensity of the sub-area 311 can be calculated from the measurement of the micro mirror 202 in FIG. 3.

Typically, there is a gap 141 between the sub-areas 306 and 311, as illustrated in FIG. 2, as a result of gaps between radiation absorption surfaces of micro mirrors (e.g., 212 and 213). Thus, the direct use of the measurements of the thermal radiation intensities in the sub-areas 305, 241, and 306 in a way as in FIG. 3 to compute the intensity of the sub-area 311 contains an approximation error for not accounting for the gap between the sub-areas 306 and 311. The approximation error can be reduced by calculating an estimate of an adjustment due to the shift of the sub-areas 305 to 306 towards the sub-area 311 to close the gap. In some implementations, the area of the gap 141 between the sub-areas 306 and 311 has a same size as the sub-area 306 (or 311). Thus, the technique to measure the intensity of the sub-area 306 can be used to measure and calculate the intensity of the gap area.

After the calculation for the sub-areas (e.g., 311) of an area of the thermal image 107 that is within the micro mirror 202 in the position without an offset (and measured by the micro mirror 213 with an offset as illustrated in FIG. 2), the technique can be applied again for the calculation of the sub-areas of an area of the thermal image 107 that is within the micro mirror 203 in the position without an offset.

Similarly, the micro mirror 211 measures the average intensity of the sub-areas 303, 231, 304, and 313 in FIG. 3 (and a portion environmental radiation outside of the thermal image 107). After the thermal radiation intensities of sub-areas 303, 231, and 304 have been calculated based on the measurements of the micro mirror 201 at varying offsets, the intensity of the sub-area 313 can be calculated from the measurement of the micro mirror 211 in FIG. 3. Since there is a gap 143 between the sub-areas 304 and 313, as illustrated in FIG. 2 (e.g., due to the gaps between radiation absorption surfaces of micro mirrors (e.g., 212 and 222)), there is an approximation error for not accounting for the gap between the sub-areas 304 and 313 in FIG. 3. The approximation error can be reduced by calculating an estimate of an adjustment due to the shift of the sub-areas 303 to 304 towards the sub-area 313 to close the gap. In some implementations, the area of the gap 143 between the sub-areas 304 and 313 has a same size as the sub-area 304 (or 313). Thus, the technique to measure the intensity of the sub-area 304 can be used to measure and calculate the intensity of the gap area.

After the calculation of the sub-areas (e.g., 313) of an area of the thermal image 107 that is within the micro mirror 211 in the position without an offset (and measured by the micro mirror 222 with an offset as illustrated in FIG. 2), the technique can be applied used for the calculation of the sub-areas of an area of the thermal image 107 that is within the micro mirror 221 in the position without an offset.

Subsequently, the technique can be further applied to calculate the thermal radiation intensity of sub-areas within next rows of areas and next columns of areas in the thermal image 107. As a result, thermal radiation intensities in various sub-areas having the sizes of P/m by Q/n can be determined for the thermal image 107. Based on the thermal radiation intensity determined for the sub-areas (e.g., 301, 303, ..., 304, 313, ..., 305, ..., 306, 307, ..., 311, ..., 321, ...) of the thermal image 107, the thermal imaging device of FIG. 1 can provide a frame of output at a resolution that is n by m times the resolution of the micro mirror array 111.

FIG. 2 to FIG. 5 illustrate techniques to compute the thermal radiation intensities in various sub-areas having the sizes of P/m by Q/n when the window element 105 is used to limit the radiation intensity on the imaging plane 108 and outside of the boundary 116 to be negligible or substantially uniform (e.g., can be measured using the micro mirrors (201, 202, 203, ...; 201, 211, 221, ...) with sufficient accuracy. Alternatively, a system of linear equations can be formulated based on the relations between the thermal radiation intensities in various sub-areas and the measurements of intensities represented by the rotations of the micro mirrors. In general, the number of unknowns (e.g., the thermal radiation intensities in various sub-areas) exceeds the number of independent equations representative of the relations between the unknowns and measurements of intensities represented by the rotations of the micro mirrors, the processor 115 can be configured to start with an initial guess of some unknowns values and converge to a solution by varying those values to optimize a spatial noise function.

FIG. 6 shows a micro mirror operable in a thermal image device according to one embodiment. For example, the micro mirrors (e.g., 201, 212, 223, ...) in FIG. 2 to FIG. 5 of the array 111 in FIG. 1 can be implemented as illustrated in FIG. 6.

In FIG. 6, the micro mirror has a plate portion 200 supported by joints 252 and 253 on portions 256 and 257 of a substrate, through a pair of bi-material inner arms 261 and 264 that are connected via two thermal isolation portions 258 and 259 to a pair of bi-material outer arms 262 and 263.

The arms (e.g., 261, 262, 263, 264) and the plate portion 200 can have a layer of heat conductive material (e.g., metal) to promote heat distribution within them and between the plate portion 200 and the inner arms 261 and 264. The thermal isolation portions 258 and 259 lack such a layer of heat conductive material (e.g., metal).

The plate portion 200 having an upper surface configured to face incoming thermal radiation 123 and a lower surface configured to face incoming light beam 413 of optical light generated by a sub-system of optical readout 113.

The lower surface of the plate portion 200 has a light reflection portion 251 configured as a mirror to reflect the incoming light beam 413 to generate a light spot 415 in the sub-system of optical readout 113. The rotation 271 of the plate portion 200 along an axis (e.g., X-axis) can be measured via the travel distance 273 of the light spot 415 (e.g., along Y-axis). An optical image sensor in the sub-system of optical readout 113 can be used to measure the travel distance (e.g., as in FIG. 7).

The upper surface of the plate portion 200 has a thermal radiation absorption material to form a radiation absorption surface 275. Energy absorbed in the upper surface can change the temperature of the plate portion 200 and thus temperature of the bi-material inner arms 261 and 264, causing the inner arms 261 and 264 to bend and thus rotate the plate portion 200.

The micro mirror has similar outer bi-material arms 262 and 263 that are attached to portions 256 and 257 of the substrate. When the environment temperate causes bending in the arms 261, 262, 263 and 264, the same amounts of bending caused by the environment change cancel of the corresponding rotation to the plate portion 200.

The thermal isolation portions 258 and 259 can prevent heat from transferring from the plate portion via the inner arms 261 and 264 to the outer arms 262 and 263. Thus, the temperature differences between the inner arms 261 and 264 and the outer arms 262 and 263 drive the rotation of the plate portion 200 in accordance with the thermal radiation intensity on the upper surface of the plate portion 200.

Further examples and details of micro mirrors can be found in U.S. Pat. No. 9,810,581, issued Nov. 7, 2017 and entitled "Micromechanical Device for Electromagnetic Radiation Sensing," the entire disclosure of which is incorporated herein by reference.

FIG. 7 shows a thermal imaging device having a scan mechanism and a sub-system of optical readout to measure rotations of micro mirrors according to one embodiment. For example, the thermal imaging device of FIG. 1 can be implemented in a way as in FIG. 7.

In FIG. 7, the sub-system of optical readout 113 can include an optical lens 405, a point light source 403 (e.g., implemented using a light emitting diode (LED)) mounted at a focal point of the optical lens 405, one or more beam splitters 407 and 408, and an optical image sensor 409.

The beam splitters 407 and 408 are positioned/sandwiched between a micro mirror array 111 and the optical image sensor 409 (e.g., implemented via complementary metal-oxide-semiconductor (CMOS) or charge-coupled device (CCD)).

The optical lens 405 converts the incoming light 411 from the point light source 403 to an incoming light beam 413 of uniform, parallel optical light that is partially reflected upwards along the Z-axis towards the light reflection portions (e.g., 251) in the micro mirror array 111. Light spots (e.g., 415) generated by the light reflection portions (e.g., 251) reflection downwards can partially go through the beam splitter 407 to be imaged by the optical image sensor 409. From the images of light spots (e.g., 415) captured by the optical image sensor 409, the processor 115 can determine the locations of the light spots (e.g., 415), the distances (e.g., 273) traveled by the light spots (e.g., 415) as results of micro mirror rotations (e.g., 271), and the intensities of the thermal radiation causing the rotations (e.g., 271), and the temperatures of objects that emit the thermal radiation (e.g., 123).

In FIG. 7, multiple beam splitters 407, 408 are used to reduce the height of the thermal imaging device. A portion of the incoming light beam 413 penetrates the beam splitter 407 to provide a light source for the next beam splitter 408, which reflects a portion of its received light beam partially upwards to a next portion of the micro mirror array 111. Light spots reflected by the mirror portions in the next portion of the micro mirror array 111 partially go through the beam splitter 408 towards the next portion of the optical image sensor 409.

Further examples and details of sub-systems of optical readout can be found in U.S. Pat. No. 9,851,256, issued Dec. 26, 2017 and entitled "Apparatus and Method for Electromagnetic Radiation Sensing," and U.S. Pat. No. 10,801,896, issued Oct. 13, 2020 and entitled "Sequential Beam Splitting in a Radiation Sensing Apparatus," the entire disclosures of which are incorporated herein by reference.

The optical image sensor 409, the processor 115 and the scan mechanism 109 can be mounted on a printed circuit board 401 and connected via traces on the printed circuit board 401.

As in FIG. 1, the thermal imaging device can have a lens system 100 that selects, focuses and shapes the incoming thermal radiation 121 as a distribution of thermal radiation of the thermal image 107 limited within a defined area on an imaging plane 108. The imaging plane 108 is configured on or near a focal point of an infrared lens 101 and the plane of thermal radiation absorption surfaces of micro mirrors (e.g., 201, 212, 223) in the array 111.

In one implementation, the scan mechanism 109 is configured to move the micro mirror array 111 in the directions of X-axis and Y-axis (e.g., slide over the beam splitters 407 and 408) relative to the printed circuit board 401 without moving the optical image sensor 409 and the lens system 100. The optical image sensor 409 and the lens system 100 can be fixed on the printed circuit board 401.

Alternatively, or in combination, the scan mechanism 109 can be configured to move the lens system 100 to effectuate offsets as illustrated in FIG. 3, FIG. 4, and FIG. 5. Optionally, the scan mechanism 109 is also used to perform image stabilization.

The processor 115 (or controller, or signal processing circuit, or both) can be configured, via logic circuits, instructions, or both, to synchronize the operations of the optical image sensor 409, the scan mechanism 109, and perform the calculations to determine the radiation intensities of sub-areas (e.g., 301, 303, 305, 311, 313) to provide an image representation of temperature distribution of a scene, with a resolution higher than the resolution of the micro mirror array 111.

Figure 8:
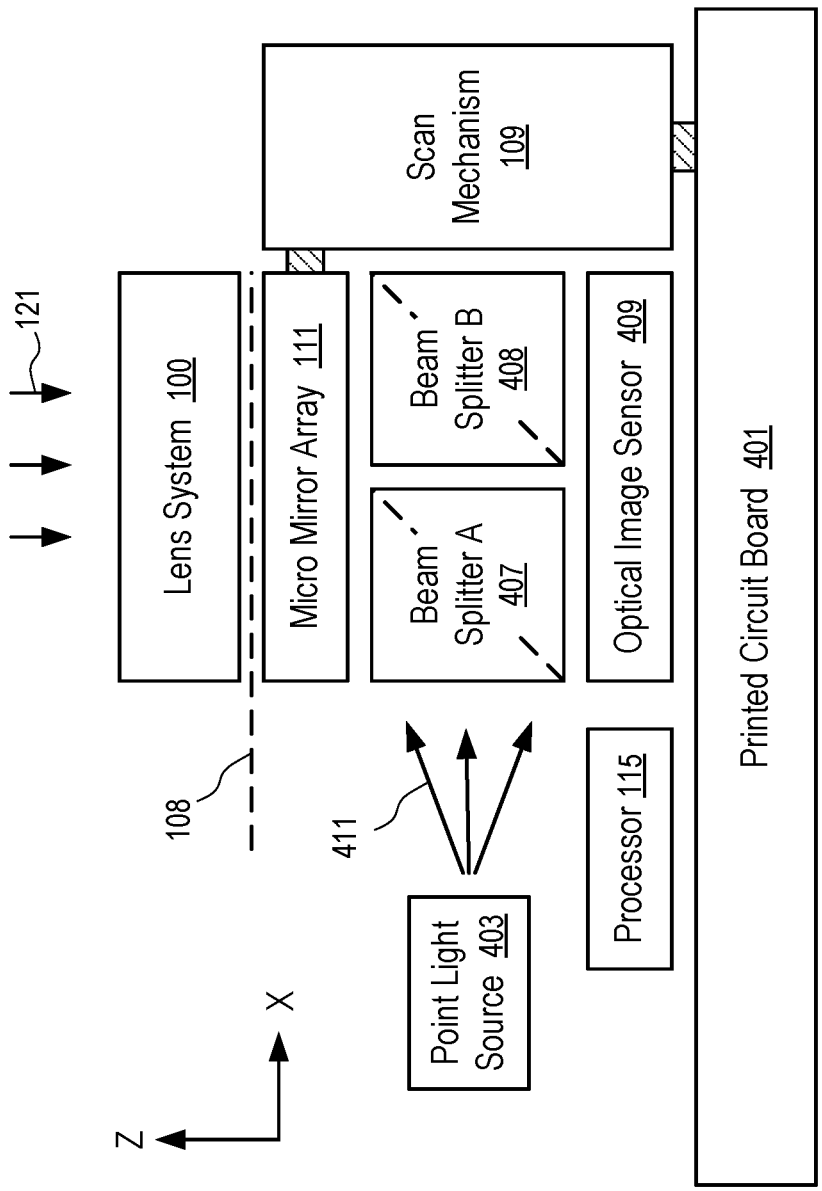
FIG. 8 shows another thermal imaging device having a scan mechanism and a sub-system of optical readout to measure rotations of micro mirrors according to one embodiment.

In some implementations, the optical lens 405 is omitted, as in FIG. 8. In the imaging device of FIG. 8, divergent, directional light 411 from the point light source 403 can be used to illuminate the micro mirror array 111 without being converted to parallel, collimated light as in FIG. 7. Light spots (e.g., 415) reflected by micro mirrors (e.g., 251) in the array 111 can form a light pattern on the imaging surface of the optical image sensor 409. In such a light pattern, light spots (e.g., 415) reflected by neighboring micro mirrors (e.g., 201 and 202; or 201 and 211) can partially overlap with each other. The light pattern as captured by the optical image sensor 409 can be processed by the processor 115 to determine the rotations (e.g., 271) of the micro mirrors (e.g., 251) in the array 111 without relying light spots from different micro mirrors being separate by dark areas in the image captured by the optical image sensor 409.

Figure 9:
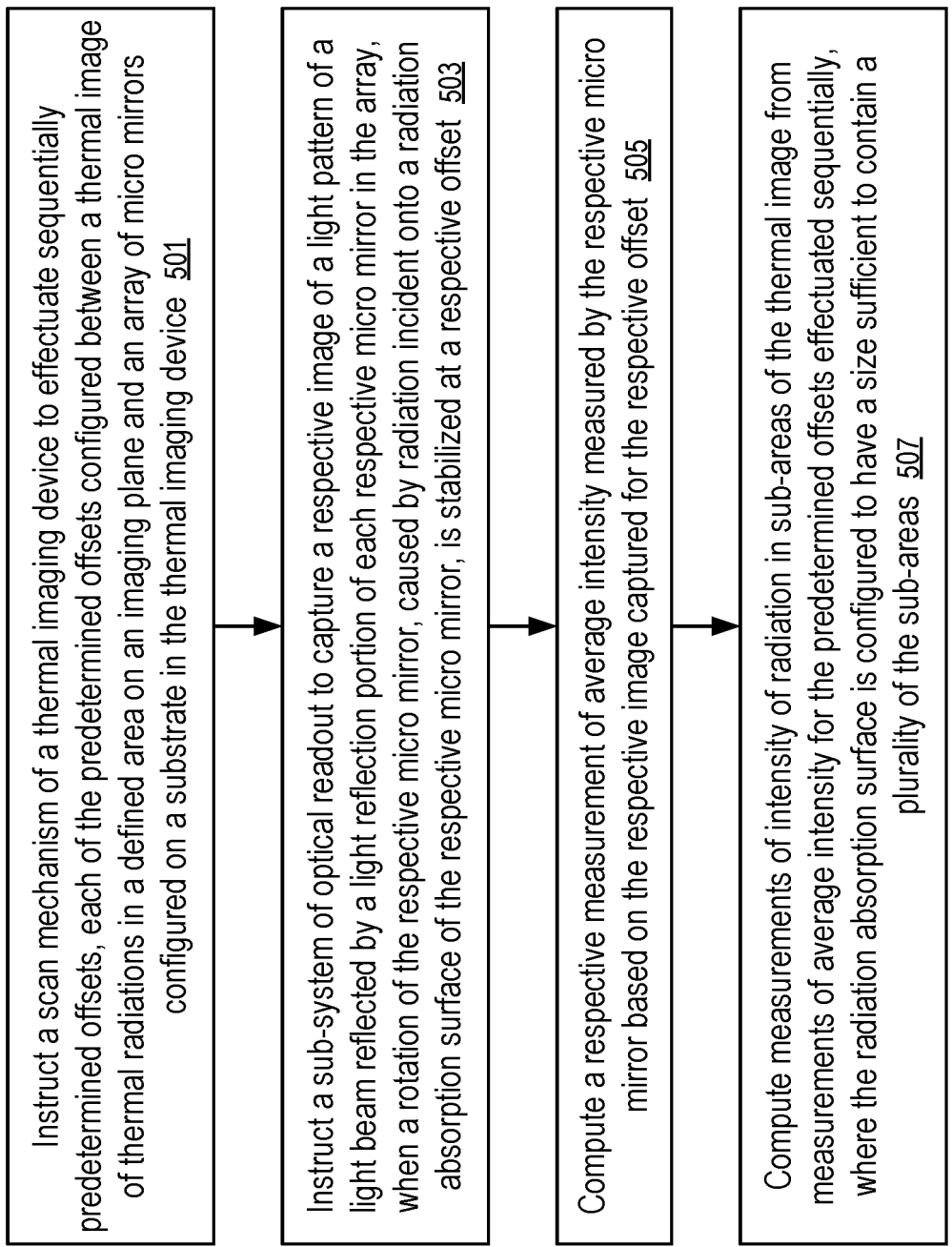
FIG. 9 shows a method to generate a high resolution output using a micro mirror array according to one embodiment.

FIG. 9 shows a method to generate a high resolution output using a micro mirror array according to one embodiment. For example, the method of FIG. 9 can be implemented in a thermal imaging device of FIG. 1, FIG. 7 or FIG. 8, or a computing device having such a thermal imaging device.

At block 501, a processor (e.g., 115) instructs a scan mechanism 109 of a thermal imaging device (e.g., as in FIG. 1 or FIG. 7) to effectuate sequentially predetermined offsets (e.g., as in FIG. 2 to FIG. 5). Each of the predetermined offsets is configured between a thermal image 107 of thermal radiations in a defined area on an imaging plane 108 and an array 111 of micro mirrors (e.g., 201, 212, 223) configured on a substrate (e.g., portions 256 and 257) in the thermal imaging device. Each of the predetermined offsets can be a fraction of dimensions (e.g., width 131 and length 133) of the radiation absorption surface 275.

For example, each respective micro mirror in the array 111 of micro mirrors (e.g., 201, 212, 223) can be configured in a way as illustrated in FIG. 6 to have a radiation absorption surface 275, a light reflection portion 251, and a plurality of bi-material arms (e.g., arms 261, 262, 263, 264) operable to cause the respective micro mirror to have an angle of rotation 271 over the substrate (e.g., portions 256 and 257) of a chip according to intensity of radiation (e.g., 123) incident on the radiation absorption surface 275.

The thermal imaging device can have a lens system 100 configured to direct thermal radiations from a scene (e.g., incoming thermal radiations 121) on the defined area having fixed boundaries 116 for the thermal image 107 on the imaging plane configured on or adjacent to the radiation absorption surface (e.g., 275).

For example, the lens system 100 can have an infrared lens 101 and a window element 105 defining an imaging window 106 configured to prevent thermal radiations from the scene (e.g., incoming radiations) from reaching the outside of boundaries 116 of the defined area of the thermal image 107. Thus, the intensity of the thermal radiation outside of the boundaries is negligible, or substantially uniform, or both. The imaging plane 108 and the radiation absorption surface (e.g., 275) can be configured on the focal plane of the infrared lens 101.

For example, the scan mechanism 109 can include a first actuator operable to effectuate an offset (e.g., width 135) in a direction of rows of micro mirrors (e.g., X-axis) in the array 111 and a second actuator operable to effectuate an offset (e.g., length 136) in a direction of columns of micro mirrors (e.g., Y-axis) in the array 111.

For example, the scan mechanism 109 can include at least a lens stabilizer, a sensor shifter, or a camera body stabilizer.

The thermal imaging device can further include a sub-system of optical readout 113 having an optical lens 405 and a point light source 403 configured at a focal point of the optical lens 405 to generate a light beam 413 incident (e.g., via beam splitters 407 and 408) on the light reflection portion 251. The sub-system of optical readout 113 has an optical image sensor 409 usable to capture an image of a light spot 415 of reflection of the light beam 413 by the light reflection portion 251.

The processor (e.g., 115) can compute a measurement of average intensity of the radiation incident on the radiation absorption surface 275 based on the image of the light spot 415 captured by the sub-system of optical readout 113.

For example, the thermal imaging device can have a printed circuit board 401. The optical image sensor 409 and the scan mechanism 109 can be fixedly attached to the printed circuit board 401. The scan mechanism 109 can be further attached to the chip of the micro mirror array 111 to move the substrate (e.g., portions 256 and 257), or attached to the lens system 100 to move the thermal image 107, in effectuating the predetermined offsets.

The predetermined offsets can be configured between the boundaries 116 of the defined area of the thermal image 107 and boundaries of the radiation absorption surface 275 to scan sub-areas (e.g., 301, 303, . . . , 304, 305, . . . , 306, . . . , 307), in the thermal image 107, that are smaller than the radiation absorption surface 275.

At block 503, the processor (e.g., 115) instructs the sub-system of optical readout 113 to capture a respective image of the light spot 415 reflected by the light reflection portion 251 of the respective micro mirror (e.g., 201) in the array 111, when the rotation 271 of the respective micro mirror (e.g., 201), caused by radiation 123 incident on its radiation absorption surface 275, is stabilized at a respective offset.

At block 505, the processor (e.g., 115) computes a respective measurement of average intensity measured by the respective micro mirror based on the respective image captured for the respective offset.

For example, in the respective image, the distance 273 traveled by the light spot 415 as a result of the rotation 271 can be detected and measured. The rotation 271 can then be determined to compute the average intensity of radiation 123 incident on the radiation absorption surface 275 while the respective offset is effectuated between the thermal image 107 and the micro mirror array 111 (and thus the radiation absorption surface 275). Different offsets result in different combinations of sub-areas of the thermal image 107 being incident on the radiation absorption surface 275. Since some of the sub-areas can have known or negligible thermal radiation intensity, as illustrated and discussed in connection with FIG. 2 to FIG. 5, intensities of radiations in other sub-areas can be calculated.

At block 507, the processor (e.g., 115) computes measurements of intensity of radiation in sub-areas (e.g., 301, 303, . . . , 304, 313, . . . , 305, . . . , 306, . . . , 307, . . . , 311, . . . , 321) of the thermal image 107 from measurements of average intensity for the predetermined offsets effectuated sequentially. Since the radiation absorption surface 275 is configured to have a size sufficient to contain a plurality of the sub-areas (e.g., 301 to 307), the collections of the measurements of intensity of radiation in sub-areas (e.g., 301, 303, . . . , 304, 313, . . . , 305, . . . , 306, . . . , 307, . . . , 311, . . . , 321) of the thermal image 107 can be used to generate an output having a resolution much higher than the resolution of the micro mirror array 111.

In one embodiment, a thermal imaging device (e.g., configured as in FIG. 1 and FIG. 7) is configured in a computer system as an input device. Optionally, the computing resources of the computer system can be used to perform the computations in generating a high resolution output from the low resolution outputs generated using the micro mirror array 111.

An example machine of a computer system within which a set of instructions, for causing the machine to perform any one or more of the methods discussed herein, can be executed. In some embodiments, the computer system can correspond to a host system that includes, is coupled to, or utilizes a memory sub-system or can be used to perform the operations described above. In alternative embodiments, the machine can be connected (e.g., networked) to other machines in a LAN, an intranet, an extranet, or the internet, or any combination thereof. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a personal digital assistant (PDA), a cellular telephone, a web appliance, a server, a network router, a switch or bridge, a network-attached storage facility, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system includes a processing device, a main memory (e.g., read-only memory (ROM), flash memory, dynamic random access memory (DRAM) such as synchronous DRAM (SDRAM) or Rambus DRAM (RDRAM), static random access memory (SRAM), etc.), and a data storage system, which communicate with each other via a bus (which can include multiple buses).

Processing device represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device can also be one or more special-purpose processing devices such as an application specific integrated circuit (ASIC), a field programmable gate array (FPGA), a digital signal processor (DSP), network processor, or the like. The processing device is configured to execute instructions for performing the operations and steps discussed herein. The computer system can further include a network interface device to communicate over the network.

The data storage system can include a machine-readable medium (also known as a computer-readable medium) on which is stored one or more sets of instructions or software embodying any one or more of the methodologies or functions described herein. The instructions can also reside, completely or at least partially, within the main memory and within the processing device during execution thereof by the computer system, the main memory and the processing device also constituting machine-readable storage media. The machine-readable medium, data storage system, or main memory can correspond to the memory sub-system.

In one embodiment, the instructions include instructions to implement functionality corresponding to the operations described above. While the machine-readable medium is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special-purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A thermal imaging device, comprising:
   an array of micro mirrors configured on a substrate, each respective micro mirror in the array having a radiation absorption surface, a light reflection portion, and a plurality of bi-material arms operable to cause the respective micro mirror to have an angle of rotation over the substrate according to intensity of radiation incident on the radiation absorption surface;
   a lens system configured to direct thermal radiations from a scene on a defined area on an imaging plane configured on or adjacent to the radiation absorption surface;
   a sub-system of optical readout configured to project a light beam on the light reflection portion and capture an image of a light pattern of the light beam reflected by the light reflection portion;
   a processor configured to compute a measurement of intensity of the radiation incident on the radiation absorption surface based on the image of the light pattern captured by the sub-system of optical readout; and
   a scan mechanism operable to effectuate predetermined offsets between a thermal image of thermal radiations in the defined area and the array of micro mirrors, each of the predetermined offsets being a fraction of dimensions of the radiation absorption surface;
   wherein the processor is further configured to:
   instruct the scan mechanism to effectuate the predetermined offsets sequentially;
   instruct the sub-system of optical readout to capture a respective image of the light pattern when the rotation of the respective micro mirror is stabilized after a respective offset is effectuated;
   compute a respective measurement of intensity measured by the respective micro mirror based on the respective image captured for the respective offset; and
   compute measurements of intensity of radiation in sub-areas of the thermal image from measurements of intensity for the predetermined offsets effectuated sequentially, wherein the radiation absorption surface is configured to have a size sufficient to contain a plurality of the sub-areas.
2. The thermal imaging device of claim 1, wherein the lens system includes an infrared lens and a window element defining an imaging window configured to prevent thermal radiations from the scene from reaching outside of boundaries of the defined area.
3. The thermal imaging device of claim 2, wherein the predetermined offsets are configured between the boundaries of the defined area and boundaries of the radiation absorption surface.
4. The thermal imaging device of claim 3, wherein the sub-system of optical readout includes a point light source configured to generate the light beam lens, and an optical image sensor configured to capture the respective image.
5. The thermal imaging device of claim 4, further comprising:
   a printed circuit board, wherein the optical image sensor and the scan mechanism are fixedly attached to the printed circuit board.
6. The thermal imaging device of claim 5, wherein the scan mechanism is configured to move the substrate to effectuate the predetermined offsets.
7. The thermal imaging device of claim 5, wherein the scan mechanism is configured to move the lens system to effectuate the predetermined offsets.
8. The thermal imaging device of claim 5, wherein the scan mechanism includes at least a lens stabilizer, a sensor shifter, or a camera body stabilizer.
9. The thermal imaging device of claim 5, wherein the scan mechanism includes a first actuator operable to effectuate an offset in a direction of rows of micro mirrors in the array and a second actuator operable to effectuate an offset in a direction of columns of micro mirrors in the array.
10. A method, comprising:
    instructing a scan mechanism of a thermal imaging device to effectuate sequentially predetermined offsets, each of the predetermined offsets configured between a thermal image of thermal radiations in a defined area on an imaging plane and an array of micro mirrors configured on a substrate in the thermal imaging device;
    instructing a sub-system of optical readout to capture a respective image of a light pattern of a light beam reflected by a light reflection portion of each respective micro mirror in the array, when a rotation of the respective micro mirror, caused by radiation incident on a radiation absorption surface of the respective micro mirror, is stabilized at a respective offset;
    computing a respective measurement of intensity measured by the respective micro mirror based on the respective image captured for the respective offset; and
    computing measurements of intensity of radiation in sub-areas of the thermal image from measurements of intensity for the predetermined offsets effectuated sequentially, wherein the radiation absorption surface is configured to have a size sufficient to contain a plurality of the sub-areas.
11. The method of claim 10, further comprising:
    directing, by an infrared lens of the thermal imaging device, thermal radiations from a scene on the defined area on the imaging plane configured on or adjacent to the radiation absorption surface to form the thermal image; and
    preventing, by a window element defining an imaging window, thermal radiations from the scene from reaching outside of boundaries of the defined area; and
    wherein the predetermined offsets are configured between the boundaries of the defined area and boundaries of the radiation absorption surface.

12. The method of claim 11, further comprising:
generating the light beam using an optical lens and a point light source configured at a focal point of the optical lens; and
capturing, using an optical image sensor, the respective image of the light pattern reflected off the light beam by the light reflection portion of the respective micro mirror in the array.

13. The method of claim 12, wherein the optical image sensor and the scan mechanism are fixedly attached to a printed circuit board; and the method further includes:
moving, by the scan mechanism, the substrate or the infrared lens to effectuate the predetermined offsets.

14. The method of claim 13, wherein the scan mechanism includes at least a lens stabilizer, a sensor shifter, or a camera body stabilizer.

15. The method of claim 13, wherein the scan mechanism includes a first actuator operable to effectuate an offset in a direction of rows of micro mirrors in the array and a second actuator operable to effectuate an offset in a direction of columns of micro mirrors in the array.

16. A non-transitory computer storage medium storing instructions which when executed by a processor, cause the processor to perform a method, comprising:
instructing a scan mechanism of a thermal imaging device to effectuate sequentially predetermined offsets, each of the predetermined offsets configured between a thermal image of thermal radiations in a defined area on an imaging plane and an array of micro mirrors configured on a substrate in the thermal imaging device;
instructing a sub-system of optical readout to capture a respective image of a light pattern of a light beam reflected by a light reflection portion of each respective micro mirror in the array, when a rotation of the respective micro mirror, caused by radiation incident on a radiation absorption surface of the respective micro mirror, is stabilized at a respective offset;
computing a respective measurement of intensity measured by the respective micro mirror based on the respective image captured for the respective offset; and
computing measurements of intensity of radiation in sub-areas of the thermal image from measurements of intensity for the predetermined offsets effectuated sequentially, wherein the radiation absorption surface is configured to have a size sufficient to contain a plurality of the sub-areas.

17. The non-transitory computer storage medium of claim 16, wherein an infrared lens of the thermal imaging device directs thermal radiations from a scene on the defined area on the imaging plane configured on or adjacent to the radiation absorption surface to form the thermal image;
wherein a window element defining an imaging window prevents thermal radiations from the scene from reaching outside of boundaries of the defined area; and
wherein the predetermined offsets are configured between the boundaries of the defined area and boundaries of the radiation absorption surface.

18. The non-transitory computer storage medium of claim 17, wherein an optical lens and a point light source configured at a focal point of the optical lens generate the light beam; and
wherein an optical image sensor captures the respective image of the light pattern reflected off the light beam by the light reflection portion of the respective micro mirror in the array.

19. The non-transitory computer storage medium of claim 18, wherein the optical image sensor and the scan mechanism are fixedly attached to a printed circuit board; and
wherein the scan mechanism moves the substrate or the infrared lens to effectuate the predetermined offsets.

20. The non-transitory computer storage medium of claim 19, wherein the scan mechanism includes a first actuator operable to effectuate an offset in a direction of rows of micro mirrors in the array and a second actuator operable to effectuate an offset in a direction of columns of micro mirrors in the array.

* * * * *